Patented Aug. 13, 1940

2,211,208

UNITED STATES PATENT OFFICE 2,211,208

MANUFACTURE OF CATALYSTS

Vladimir N. Ipatieff and Ben B. Corson, Chicago, Ill., assignors to Universal Oil Products Company, Chicago, Ill., a corporation of Delaware No Drawing. Application October 31, 1938, Serial No. 238,071

3 Claims. (Cl. 23—233)

This invention relates particularly to the manufacture of catalysts of definite forms and sizes by pelleting extrusion, or other mechanical forming methods to assure production of particles of uniform size and shape as opposed to the manufacture of granular catalysts by methods of grinding and sizing prepared solid materials.

The invention is more specifically concerned with the manufacture of catalysts comprising relatively inert materials usually of a refractory character supporting more catalytically active compounds or elements and the present method of manufacture is therefore applicable to the production of catalysts having a wide variety of uses in chemical processes particularly those involving reactions wherein the vapors of a single compound or several compounds are contacted with a catalyst under conditions of temperature, pressure, and time suitable for accomplishing the desired results.

It is recognized to be common practice to impregnate relatively inert granular supports with catalytically active materials by such methods as mixing solutions of salts containing a volatile acidic or basic constituent with prepared granules and later calcining and volatilizing these materials to leave a residue of the desired catalyst, by precipitating hydroxides and other compounds from solutions in which prepared inert granular carriers are suspended, by choosing salts containing catalytically active materials with the same types of granular supports and numerous other methods for example, by mixing powdered supports with salts furnishing catalysts on calcination and then pelleting or otherwise forming the composite powders. Methods of catalyst manufacture are so numerous that it is recognized that the few methods thus mentioned are only a small fraction of those in use.

In manufacturing pellets of various shapes it is frequently necessary to employ lubricants in the mixtures fed to the pelleting machines in order to avoid the sticking of the dies and general inefficiency of the operation, and it is with the use of lubricants of a very particular and novel type in catalyst forming operations that the present invention is concerned.

In one specific embodiment the present invention comprises the manufacture of formed catalyst particles by subjecting mixtures comprising finely divided catalytic materials and minor amounts of lubricants, comprising metal soaps to compression in reciprocating pilling machines.

We have found that certain metal stearates and palmitates and also stearic acid are effective lubricants in catalyst pelleting operations. The amounts of these substances necessary for satisfactory pilling operations depend upon the type of powdered material which is undergoing pelleting, the type of machine, the size of the pills produced, and a number of other factors, but in general the amounts of the preferred lubricants necessary are of the order of less than 5% by weight of the powder. The following listed compounds have been found to be useful as lubricants and are given for the sake of examples. Obviously not all of these compounds are exactly equivalent in their effects. Not only because their lubricating value varies with any given catalyst-containing powder, but because they will leave different residues when the organic radicals are burned out and the corresponding metal oxides are left in the formed catalyst particles to exert a promoting or an inhibiting effect on the catalyst particles to exert a promoting or an inhibiting effect on the catalytic activity of the catalyst as a whole.

*Catalyst lubricants*

Nickel stearate
Nickel palmitate
Copper stearate
Aluminum stearate
Aluminum palmitate
Chromium stearate
Chromium palmitate
Calcium stearate
Calcium palmitate
Barium stearate
Barium palmitate
Magnesium stearate
Magnesium palmitate
Zinc stearate
Stearic acid Besides being satisfactory lubricants in pilling or other forming operations, the present types of lubricants have a further distinct advantage in that when the organic radicals are ignited and burned out a porous structure is left which has distinct advantages in many instances, particularly if the size of the pores is regulated so that penetration of reacting vapors corresponds to a definite time of contact.

A further advantage is offered in that surface impregnation of particles may be made easier. Thus in the case of reactions involving hydrocarbons or other organic compounds of various types, there is ordinarily a gradual tendency to the deposition of carbon which ultimately coats the active catalyst surfaces and renders them inert after a period of service. In some instances where catalytically active material is disseminated throughout the volume of a relatively inert support, the vapors penetrating to the interior of the particle have too long a time of contact and thus deposit carbon more rapidly so that the interior of the particle becomes useless for catalytic purposes in a short time. It has been found in some instances that by producing particles by pilling the powders of these inert supporting substances in admixture with the preferred lubricants, and then impregnating with solutions of salts, from which catalytic residues may be developed by heating, deep penetration of the solutions is retarded by the presence of the lubricants and ultimately, after calcining, active catalyst is only present in a relatively thin surface layer so that greatly reduced amounts of carbon are deposited in the non-catalytic interior of the particle. The results of this method of manufacture are advantageous from several standpoints. In the first place, substantially all active catalytic material is in contact with vapors undergoing conversion under approximately the same conditions of temperature, pressure, and time of contact, and in the second place no active catalyst is wasted by becoming quickly coated with carbonaceous deposits in the interior of the particle.

Graphite and other substances have been similarly proposed as lubricants in the pilling of the catalysts but the present types of lubricants have been found to present superior advantages over previous types. For example, in the case of graphite, this substance is only removed as a result of severe oxidizing conditions whereas the present types of compounds are decomposed to remove organic radicals under relatively mild conditions of temperature.

The present types of lubricants have been found to be particularly effective in the manufacture of composite catalysts utilizable in hydrocarbon reactions such as, for example, dehydrogenation and hydrogenation reactions and in catalysts accelerating and directing the oxidation of hydrocarbons to produce a wide variety of products. As examples of dehydrogenating catalysts, those consisting of a major proportion by weight of relatively inert and usually siliceous carrier supporting minor proportions by weight of such dehydrogenating oxides as those of the elements in the lefthand columns of groups 4, 5, and 6 of the periodic table may be mentioned. A specific and highly effective member of this general group of catalysts consists of alumina particles impregnated or surfaced by oxides of chromium, molybdenum, or vanadium, and particularly the sesquioxide of chromium, $Cr_2O_3$. Hydrogenation catalysts are well represented by reduced nickel which is most effectively used on supports such as for example, kieselguhr and other hydrogenating catalysts include the other members of the iron group and the platinum group. Oxidation catalysts are extremely varied and include the oxides of vanadium, iron oxide, and others.

The following examples are given of the manufacture of catalysts using the lubricants which characterize the present invention, but they are merely representative of a large number of other similar cases of catalyst manufacture and are not intended to restrict the scope of the invention in exact correspondence with the data presented.

*Example I*

A number of test runs were made in which different metallic soaps were incorporated in primary powdered materials which contained nickel carbonate and which were pelleted, calcined, and reduced to make composites containing active nickel for hydrogenation work. Short cylindrical pills 1/8" long by 1/8" diameter were made from a mixture of nickel carbonate and kieselguhr in 96 parts by weight and containing four parts by weight of the various lubricants previously tabulated. The pills were heated in a current of air for 12 hours at a temperature range from 100 up to 370° C. after which they were reduced in a stream of hydrogen for 12 hours at about 425° C., being finally cooled in a stream of carbon dioxide. Each material was tested for hydrogenating activity by passing a mixture of hydrogen and benzene vapors over the catalyst pills contained in a heated tube at 100° C. and atmospheric pressure. In all cases 100% hydrogenation was noted since the liquid products corresponded exactly in properties with cyclohexane.

*Example II*

960 parts by weight of powdered activated alumina (40–80 mesh) were mixed with a solution of 52.6 parts by weight of chromic acid in 480 parts by weight of water. The mix was dried over a steam bath for three hours with stirring and then further dried for 17 hours at 95° C. This powder was mixed with 40 parts by weight of aluminum stearate and the mix was pilled in 1/8" by 1/8" pills in a machine of standard type. The particles then contained approximately 4% by weight of chromium sesquioxide ($Cr_2O_3$), 3.8% of aluminum stearate and 9.9% of water. The pills were later calcined at a temperature of approximately 400° C. in air to volatilize and burn out the stearic acid radical. The above catalyst was used in the dehydrogenation of normal butane at 600° C. and a space velocity of 1500. Alternate periods of service of 45 minutes and reactivation cycles of 15 minutes were used for a period of 187 cycles. The butane content of the exit gases was maintained at about 18% for this period after which it was found that the carbon content of the particles was about 2%.

By pelleting powdered activated alumina with 5% weight of aluminum stearate and effecting a surface impregnation only with the solution of chromic acid prior to calcining to remove the stearic acid radical, the amount of chromia actually present on the surface of the prepared pellets was of the order of 10% and after use for approximately the same number of cycles, the carbon content of the pellet was found to be less than 1%.

We claim as our invention:

1. In the manufacture of solid catalysts, the steps of mixing a finely divided carrier material with a metal soap, mechanically compressing the resultant mixture into shaped bodies, and then impregnating said bodies with a solution of a catalytically active substance.

2. In the manufacture of solid catalysts, the steps of mixing a finely divided carrier material with a metal soap, mechanically compressing the resultant mixture into shaped bodies, impregnating said bodies with a metal salt solution whose residue is catalytic, and then heating the impregnated bodies to form said residue on the surface thereof.

3. A process for manufacturing a pelleted composite catalyst consisting essentially of a relatively inert carrier supporting a minor amount of a catalytically active material which comprises mixing the finely divided carrier with a minor amount of a metal soap of a normally solid organic acid, subjecting the mix to the action of a reciprocating pelleting machine to form pellets, forming a superficial deposit of the active catalyst on the pellets by adding a solution of a metal salt thereto, and subsequently calcining in an oxidizing atmosphere to remove organic and inorganic acid radicals.

VLADIMIR N. IPATIEFF.
BEN B. CORSON.